United States Patent [19]

Kimura

[11] Patent Number: 5,758,280
[45] Date of Patent: May 26, 1998

[54] RADIO COMMUNICATION APPARATUS

[75] Inventor: Misa Kimura, Tokyo, Japan

[73] Assignee: NEC Corporation, Tokyo, Japan

[21] Appl. No.: 713,483

[22] Filed: Sep. 13, 1996

[30] Foreign Application Priority Data

Sep. 14, 1995 [JP] Japan ................... 7-262451

[51] Int. Cl.$^6$ ................... H04Q 7/38
[52] U.S. Cl. ................... 455/412; 455/567
[58] Field of Search ................... 455/412, 413, 455/567, 575, 38.4

[56] References Cited

U.S. PATENT DOCUMENTS

| | | | |
|---|---|---|---|
| 4,941,167 | 7/1990 | Cannalte et al. | 455/412 |
| 5,058,150 | 10/1991 | Kang | 455/412 |
| 5,583,915 | 12/1996 | Ishida | 455/412 |
| 5,630,207 | 5/1997 | Gitlin | 455/38.4 |

FOREIGN PATENT DOCUMENTS

4-258029  9/1992  Japan .

Primary Examiner—Amelia Au
Attorney, Agent, or Firm—Sughrue, Mion, Zinn, Macpeak & Seas, PLLC

[57] ABSTRACT

A handy phone or similar radio communication apparatus of the present invention detects a calling apparatus, displays it for confirmation, displays a plurality of messages stored beforehand to allow the user of the apparatus to select an adequate message matching the calling apparatus, and then sends the message selected to the calling apparatus. This allows a person originating the call to take an adequate measure at the earliest possible time and keeps the third party from private messages or information.

6 Claims, 7 Drawing Sheets

RADIO COMMUNICATION APPARATUS

BACKGROUND OF THE INVENTION

The present invention relates to a handy phone or similar radio communication apparatus and, more particularly, to a radio communication apparatus having a function of sending, on receiving a call, a necessary message to a calling apparatus without the user of the apparatus answering the call.

It is a common practice to allow the user of, e.g., a handy phone to set up a rejection mode when the user cannot answer an incoming call for one reason or another. To set up the rejection mode, the user operates a particular button provided on the phone on the receipt of the call or beforehand. A code representative of the rejection mode is sent from the phone to a calling phone via a base station. The code informs the calling person of the fact that the called person cannot answer the call. Such a conventional rejection system, however, cannot show the calling person why the called person cannot answer the call. Therefore, the calling person must repeat the call origination or is apt to wait more than a necessary period of time, failing to contact the called person at the earliest possible time.

In light of the above, Japanese Patent Laid-Open Publication No. 4-258029 proposes a system in which a message representative of the state of a mobile station is coded and sent over, e.g., a control channel included in a telephone channel. When the mobile station rejects the incoming call, the coded message allows the calling person to see, e.g., whether the called person is absent or whether the called person is busy. It is also proposed to display the rejection on a display panel provided on the calling station.

However, the above coded message scheme has the following problems left unsolved. In a rejection mode, the system causes only a preselected message to be unconditionally sent on the receive of a call. This prevents a particular message adequate for a caller from being sent. Assume that a person prepares a private message with a substantial content and meant for a particular caller. Then, on the receipt of a call from the third party, the private message is sent to the third party. This is undesirable from the secrecy standpoint.

SUMMARY OF THE INVENTION

It is therefore an object of the present invention to provide a radio communication apparatus capable of allowing the user of the apparatus to confirm a caller and then send a necessary message meant only for the caller.

In accordance with the present invention, a radio communication apparatus having a rejecting function for informing a calling apparatus of the fact that a received call will not be answered has a first display for detecting the calling apparatus on the receipt of a call, and displaying the calling apparatus. A storage stores a plurality of answer messages beforehand. A second display displays the plurality of answer messages in a rejection mode. A selecting section allows any one of the plurality of answer messages to be selected on the second display. A transmitter section transmits the message selected via the selecting section to the calling apparatus.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
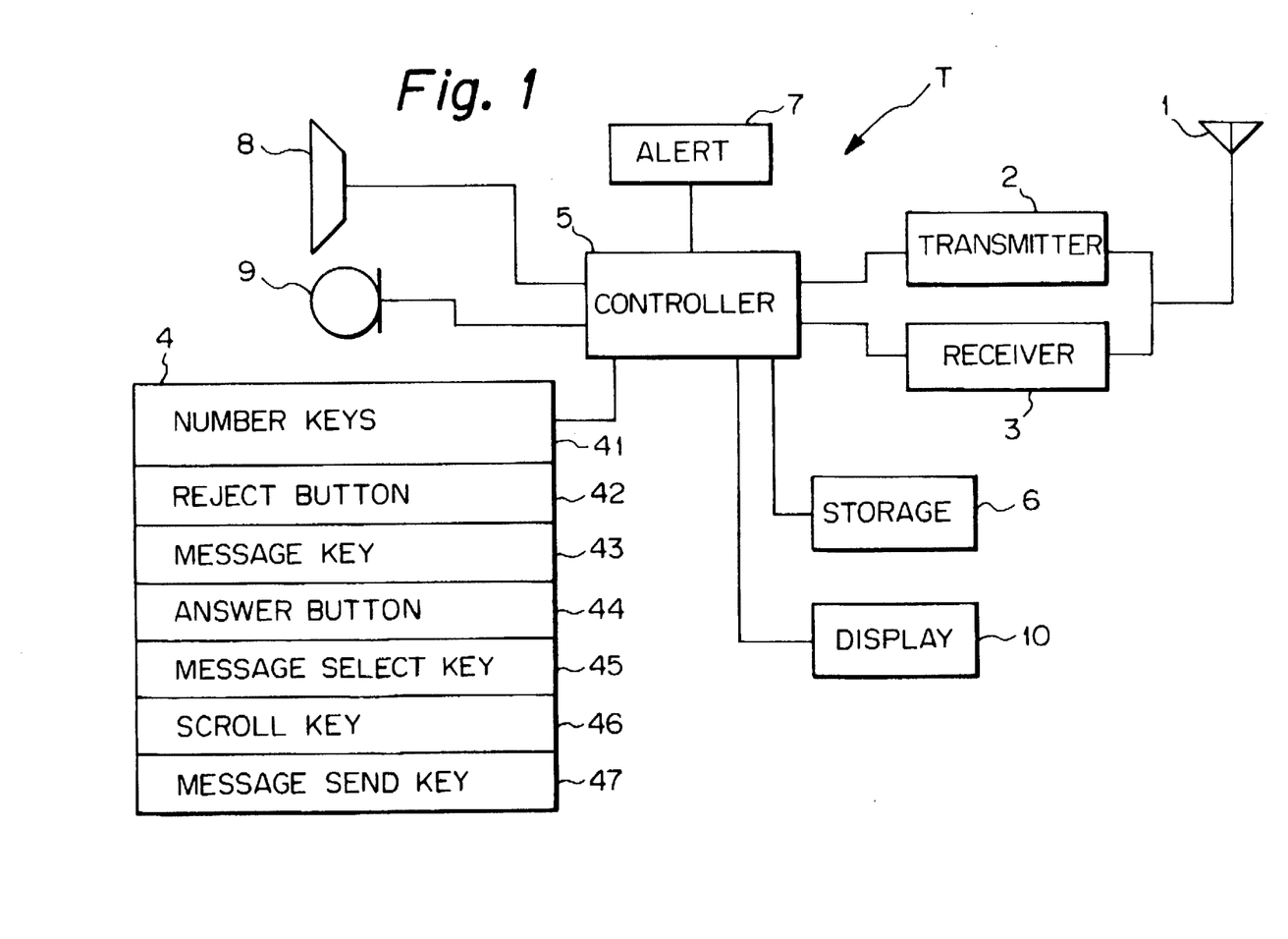
FIG. 1 is a block diagram schematically showing a radio communication apparatus embodying the present invention.

Referring to FIG. 1 of the drawings, a radio communication apparatus embodying the present invention is shown and implemented as a handy phone by way of example. As shown, the handy phone, generally labeled T, has a transmitter section 2 and a receiver section 3 which are connected to an antenna 1. The transmitter section 2 and receiver section 3 respectively sends and receives radio signals to and from a base station via the antenna 1. An input section 4 has various kinds of buttons and keys to be operated by the user of the phone T. A controller 5 controls the input section 4, transmitter section 2 and receiver section 3 as well as other sections which will be described. A storage 6 stores messages, phone numbers, names each corresponding to a particular phone number, and other necessary data. An alert section 7 alerts, when the phone T receives a call, the user to the call by sound, vibration or the like, as desired. A received speech signal is output via a speaker 8. The user's speech is input to the phone T via a microphone 9. A display 10 displays messages and other information.

The input section 4 has numeral keys 41 ("0" through "9"), a reject button 42 for rejecting the receipt of a call, a message key 43 for composing, displaying or deleting messages, an answer button 44 for answering an incoming call, a message select key 45 for selecting a message, a scroll key 46 for scrolling the display 10, and a message send key 47.

Figure 2:
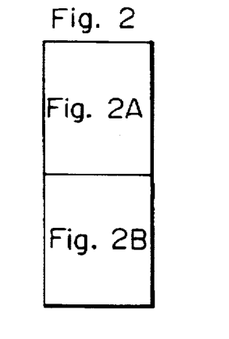
FIG. 2 is a flowchart demonstrating a specific operation of the embodiment.
Figure 2A:
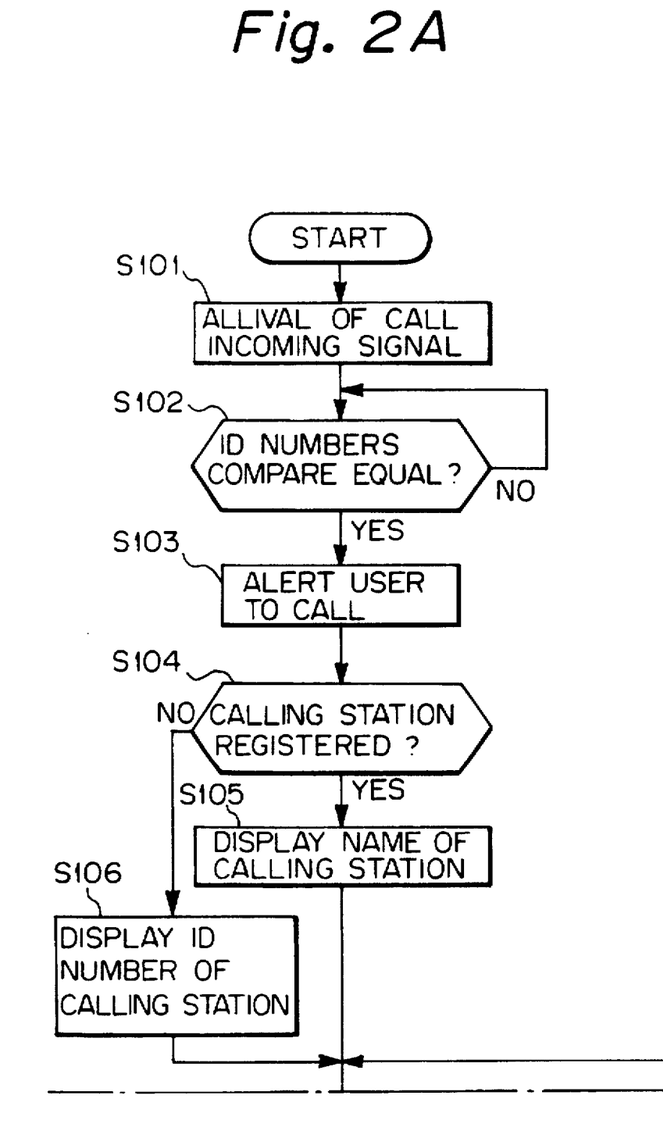
Figure 2B:
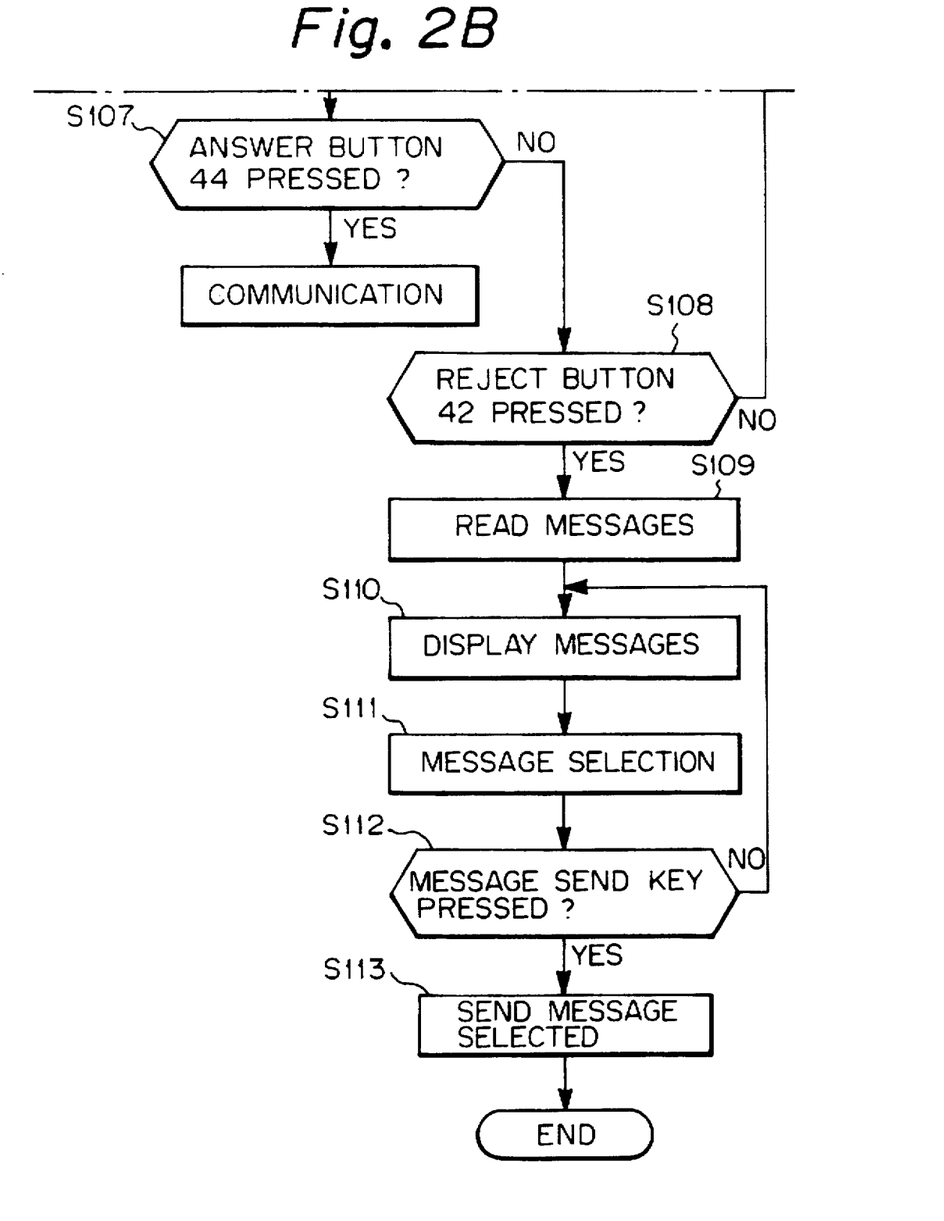

A specific operation of the handy phone T will be described with reference to FIG. 2. Assume that while the phone T is in a stand-by state, a call meant for the phone T is originated on another phone. Then, the phone T receives a call incoming signal from a nearby base station (step S101). The incoming call signal includes an identification (ID) number assigned to the calling phone, and an ID number assigned to the called phone T. In the phone T, the controller 5 compares the ID number of the calling phone and that of the called phone T (step S102). If the two ID numbers compare equal (Y, step S102), the controller 5 drives the alert section 7 in order to alert the user to the receipt of a call by, e.g., sound or vibration (step S103).

Subsequently, the controller 5 checks the storage 6 to see if the ID number, e.g., phone number of the calling station included in the received signal is stored therein (step S104). If the answer of the step S104 is positive (Y), the controller 5 displays the name corresponding to the ID number on the display 10 (step S105). If the answer of the step S104 is negative (N), the controller 5 displays the ID number of the calling station on the display 10 (step S106). If the user confirmed the caller on the display 10 desires to answer the call, the user operates the answer button 44 (step S107). As a result, a communication is held between the two phones.

Figure 3:
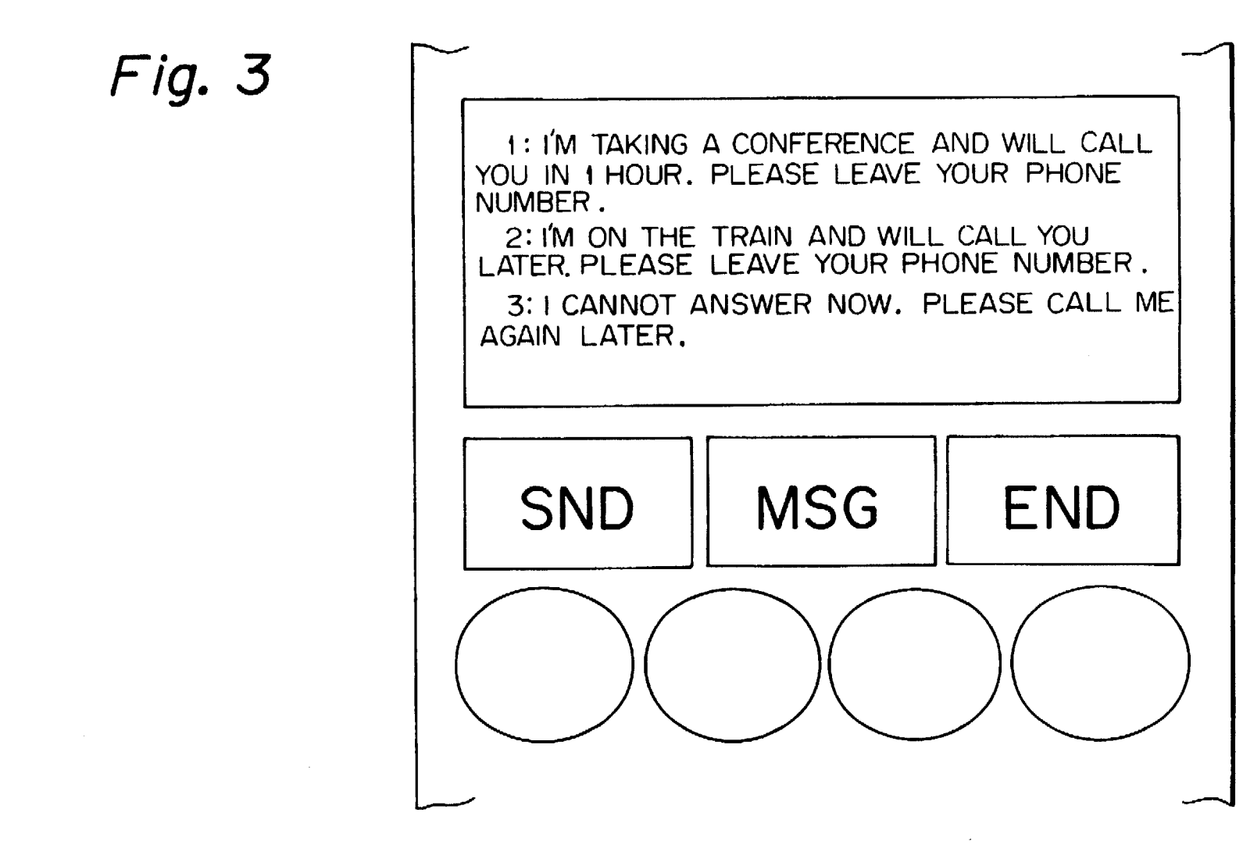
FIG. 3 shows exemplary messages appearing on a display included in the embodiment.

On the other hand, assume that the user received the call should reject the incoming call. Then, the user operates the reject button 42 (step S108). In response, all the messages stored in the storage 6 are read out (step S109) and displayed on the display 10 (step S110). FIG. 3 shows three exemplary messages appearing on the display 10. The user scrolls the display 10 up or down until a desired message appears, positions a cursor at the desired message, and then operates the message select key 45 to select the message to be sent (step S111). The user may select two or more messages by repeating the above manipulation, i.e., the positioning of the cursor and the operation of the message select key 45, if desired. Thereafter, the user operates the message send key 47 (step S112). As a result, the message or messages selected are sent to the calling station (step S113).

While the phone T is not in communication, the user may operate the message key 43 in order to, e.g., compose or delete messages, as desired. Messages can be freely input on the numeral keys 41. For example, if the numeral keys 41 are respectively assigned to fixed words, phrases or sentences beforehand, the user can compose or delete desired messages on the keys 41. Further, how frequently each message is used may be written to the storage 6 together with the message. In such a case, the messages will appear on the display 10 in the decrementing order with respect to the frequency of use at the time of message selection. If desired, a key may be operated to replace the decrementing order with an incrementing order.

As stated above, the user of the phone T can confirm a caller originating a call without fail, and send an adequate message to the caller if the user rejects the call. This allows the caller to see why the called person has rejected the call, and to take an adequate measure for contacting the called person at the earliest possible time. Moreover, because only a particular message is sent to each caller, the third party is prevented from receiving an unexpected private message. This is desirable from the secrecy standpoint.

Figure 4:
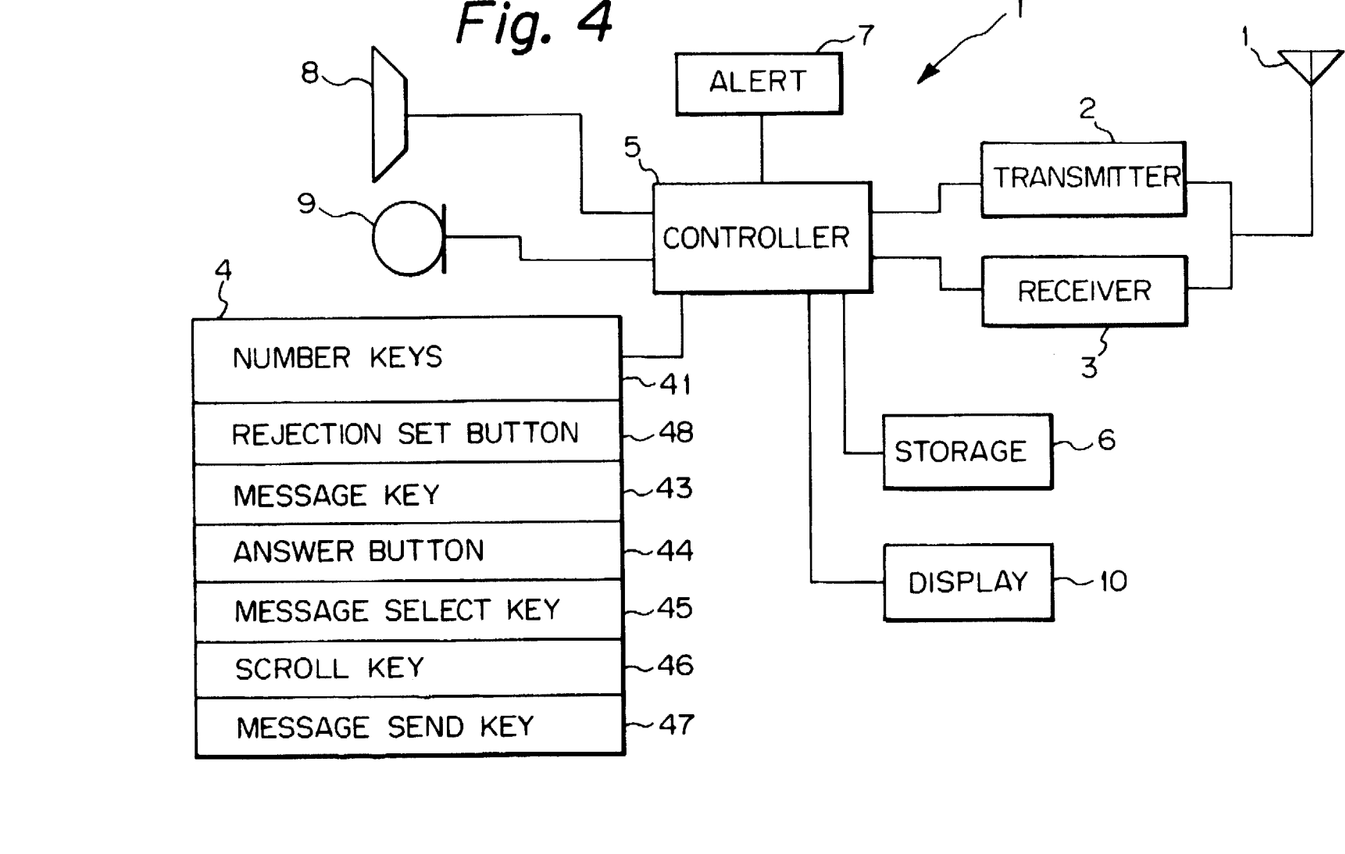
FIG. 4 is a block diagram schematically showing an alternative embodiment of the present invention.

Referring to FIG. 4, an alternative embodiment of the present invention will be described. In FIG. 4, the same or similar structural elements as or to the elements shown in FIG. 1 are designated by the same reference numerals, and a detailed description thereof will not be made in order to avoid redundancy. As shown, this embodiment is identical with the previous embodiment except that a rejection set button 48 is substituted for the reject button 42.

Figure 5A:
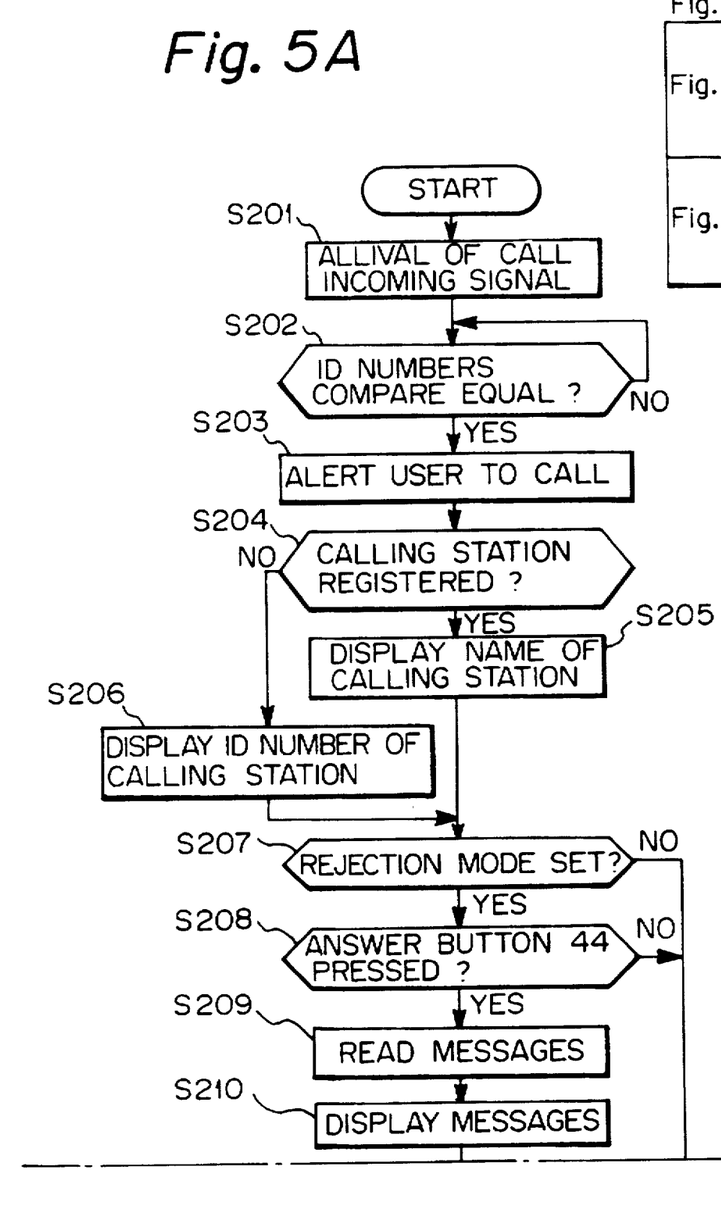
FIG. 5 is a flowchart demonstrating a specific operation of the embodiment shown in FIG. 4.
Figure 5B:
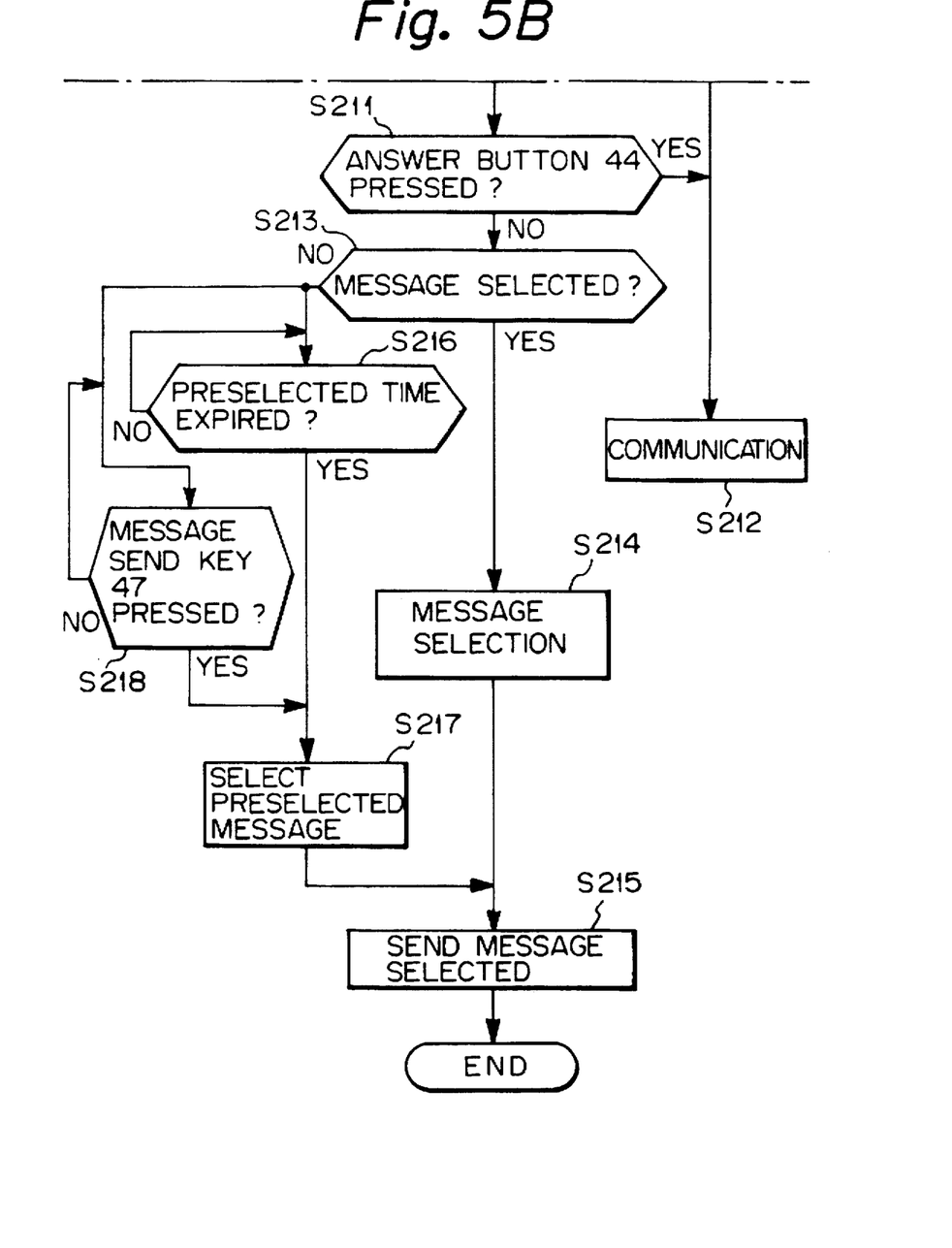

The operation of the illustrative embodiment will be described with reference to FIG. 5. Assume that while the phone T is in a stand-by state, the user presses the rejection set button 48. Then, the controller 5 sets up a rejection mode when the user presses the answer button 44 on the receipt of a call. In FIG. 5, steps S201–S206 are identical with the steps 101–106 shown in FIG. 2. After the step S205 or S206, the controller 5 determines whether or not the rejection set button 48 has been pressed (step S207). If the answer of the step S207 is N, the controller 5 sets up a communication mode (step S212). If the answer of the step S207 is Y, the controller 5 sets up a rejection mode. In the rejection mode, when the user presses the answer button 44 (step S208), the controller 5 reads all the messages out of the storage 6 (step S209) and displays them on the display 10 (step S210). If the user again presses the answer button 44 (Y, step S211), the controller 5 replaces the rejection mode with the communication mode and allows the user to hold a communication with the caller. This communication mode can be used when the user has forgotten to reset the rejection mode or when the user must converse with the caller despite the rejection mode.

If the answer of the step S211 is N, the controller 5 determines whether or not the user has selected a message on the display 10 by using the scroll key 46 and message select key 45 (step S213). If the answer of the step S213 is Y, the controller selects the desired message (step S214) and then sends it on the operation of the message send key 47 (step S215), as in the previous embodiment.

If the answer of the step S213 is N, the controller 5 determines whether or not a preselected period of time has elapsed (step S216). If the answer of the step S216 is Y, the controller 5 automatically reads a preselected message out of the memory 6 (step S217) and then sends it to the calling station (step S215). This is also true when the user operates the message send key 47 without selecting any message (Y, step S218).

Preferably, a particular message should be assigned to each phone which may call the phone T. Then, on the receipt of a call, a message matching a calling phone can be sent to the calling phone.

This embodiment has the following advantage in addition to the advantages of the previous embodiment. When the user of the phone T does not select any message on the display 10, a particular message selected beforehand is automatically sent to the calling station. Therefore, when the received call is from, e.g., the third party, a common message not needling secrecy is automatically sent to the third party.

In summary, it will be seen that the present invention provides a radio communication apparatus capable of sending a particular adequate message to each calling station and allowing the calling station to take an adequate measure, and insuring secrecy by keeping the third party from private messages.

Various modifications will become possible for those skilled in the art after receiving the teachings of the present disclosure without departing from the scope thereof. For example, the present invention is applicable not only to a handy phone but also to any other radio communication apparatus having its own ID number and a rejecting function.

What is claimed is:

1. A radio communication apparatus having a rejecting function for informing a calling apparatus of a fact that a received call will not be answered, said apparatus comprising:

first display means for detecting the calling apparatus on the receipt of a call, and displaying the calling apparatus;

storing means for storing a plurality of answer messages beforehand;

second display means for displaying said plurality of answer messages in a rejection mode;

selecting means for allowing any one of said plurality of answer messages to be selected on said second display means; and transmitting means for transmitting the message selected via said selecting means to the calling apparatus.

2. An apparatus as claimed in claim 1, further comprising inputting means including a reject button, wherein said apparatus sets up the rejection mode when said reject button is pressed on the receipt of a call.

3. An apparatus as claimed in claim 1, further comprising inputting means including a rejection set button and an answer button, wherein when said rejection set button is pressed beforehand, a rejection mode is set up and is replaced with a communication mode if said answer button is pressed a preselected number of times afterwards.

4. An apparatus as claimed in claim 1, wherein said store means stores a frequency of use of each message together with the message, and wherein said second display means displays the messages in a decrementing order with respect to the frequency.

5. An apparatus as claimed in claim 1, wherein when no messages are selected on said second display or when a preselected period of time expires without any message selection, preselected one of said plurality of messages is automatically selected and sent to the calling apparatus.

6. An apparatus as claimed in claim 5, wherein a particular message assigned to each calling apparatus is stored in said store means.

* * * * *